United States Patent [19]
Proulx

[11] Patent Number: 5,669,185
[45] Date of Patent: Sep. 23, 1997

[54] SHUTTER FOR BUILDINGS

[76] Inventor: Karen A. Proulx, P.O. Box 367, 2298 N. East Lake Rd., Hopkins, Mich. 49328

[21] Appl. No.: 603,266

[22] Filed: Feb. 20, 1996

[51] Int. Cl.⁶ .................. E06B 7/08; A01G 9/02
[52] U.S. Cl. .................. 52/27; 52/473; 47/40; 47/36; 47/67 R; D6/569
[58] Field of Search .............. 52/27, 36.1, 473; 47/67 R, 68, 40, 36, 39, 60 W; D6/561, 569, 555; D11/143, 156

[56] References Cited

U.S. PATENT DOCUMENTS

| D. 196,306 | 9/1963 | Bodenbach | D35/3 |
|---|---|---|---|
| D. 248,633 | 7/1978 | Wood | D11/155 |
| D. 307,877 | 5/1990 | White, Jr. | D11/148 |
| D. 322,418 | 12/1991 | White | D11/144 |
| 2,584,699 | 2/1952 | Hansen | 40/125 |
| 2,720,056 | 10/1955 | Levy | 47/41 |
| 3,121,481 | 2/1964 | Johnson | 52/473 X |
| 3,593,470 | 7/1971 | Francis | 52/36 |
| 3,782,051 | 1/1974 | Quinif | 52/473 |
| 3,800,470 | 4/1974 | Kleine | 47/40 |
| 3,935,671 | 2/1976 | Soot | 47/34 R |
| 4,380,136 | 4/1983 | Karpisek | 47/83 |
| 4,381,633 | 5/1983 | MacLeod | 52/473 |
| 4,463,855 | 8/1984 | Smithers | 211/71 |
| 4,499,688 | 2/1985 | Droll | 47/83 |
| 4,593,490 | 6/1986 | Bodine | 47/79 |
| 4,800,675 | 1/1989 | Feil et al. | 47/33 |
| 4,896,456 | 1/1990 | Grant | 47/67 |
| 5,067,286 | 11/1991 | Richer | 52/27 |
| 5,095,653 | 3/1992 | Guldberg | 47/83 |
| 5,152,116 | 10/1992 | MacGowan | 52/473 X |
| 5,163,260 | 11/1992 | Ricard et al. | 52/473 |

FOREIGN PATENT DOCUMENTS

| 2241684 | 4/1975 | France | 52/475 |
|---|---|---|---|
| 2699800 | 7/1994 | France | 47/40 |
| 1209865 | 1/1966 | Germany | 52/395 |
| 3726728 | 2/1989 | Germany | 47/68 |

*Primary Examiner*—Carl D. Friedman
*Assistant Examiner*—Winnie Yip
*Attorney, Agent, or Firm*—Price, Heneveld, Cooper, DeWitt & Litton

[57] ABSTRACT

In combination with a window or other opening of a building, a pair of vertically elongated shutters are located on each of the vertical side of the opening. Each of the shutters include at least one planter box extending laterally along the shutter and supported by the shutter to form an integral shutter unit.

7 Claims, 2 Drawing Sheets

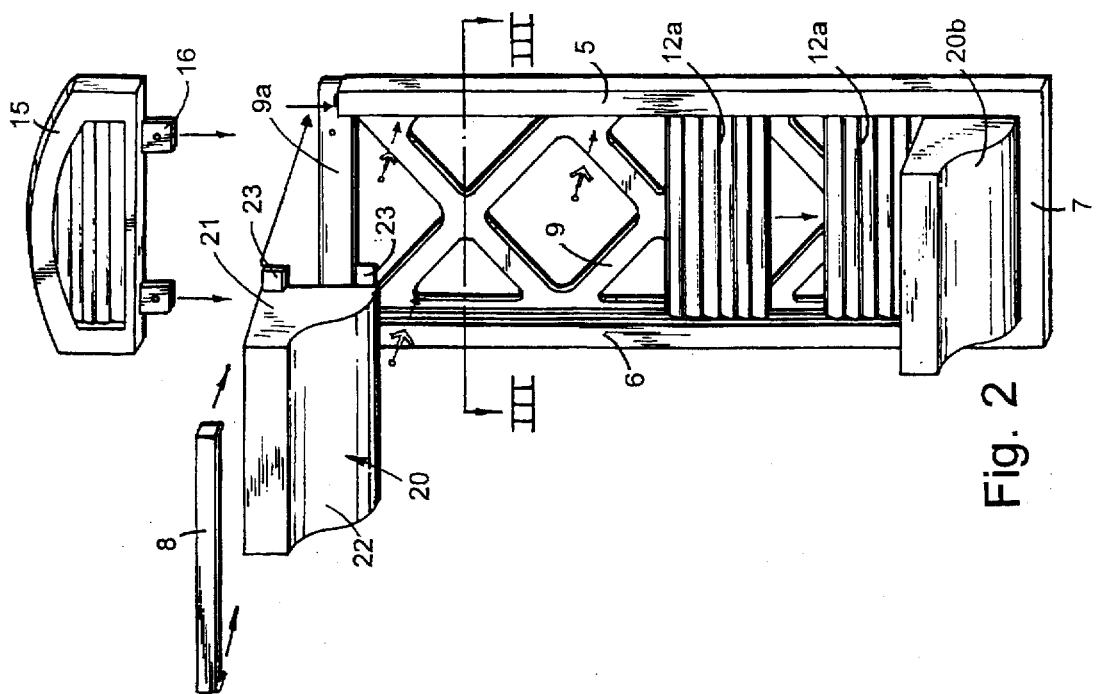
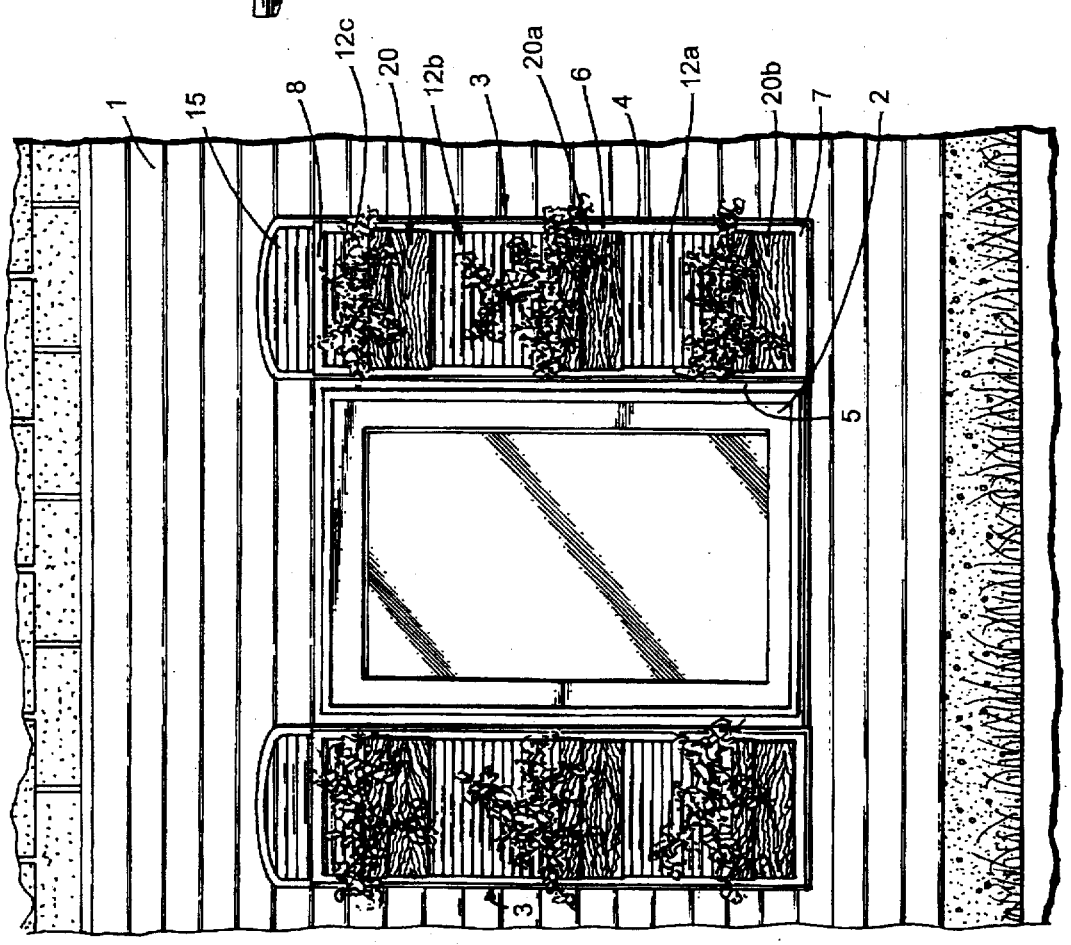

SHUTTER FOR BUILDINGS

This invention relates to a shutter which is used as a decorative effect for openings in buildings such as windows.

BACKGROUND OF THE INVENTION

Shutters for buildings such as windows and doors have been in existence for a long time. Such shutters are generally located on each side of a window or other opening for buildings to provide a decorative effect. However, to my knowledge no one has ever conceived of incorporating within the shutter one or more planter boxes for flowers or the like. Planter boxes have been mounted under windows for decorative reasons. But no one has ever incorporated as in integral part of a shutter a planter box in which flowers can be planted to enhance the decorative effect of a shutter.

SUMMARY OF THE INVENTION

In accordance with my invention, one or more planter boxes are made as an integral part of a shutter. Thus, combined with the decorative elements generally associated with shutters such as levered slats the combination of such decorative elements and the flowers give a greatly enhanced decorative effect to the shutters located on each side of a window.

The construction of my shutter includes a frame having two spaced vertical sides with a slot in the sides facing each other. The decorative elements are constructed to slide into the slots. The planter boxes are provided with supports extending from each end of the planter box. These supports are also adapted to slide in the slots of the vertical sides so as to support the boxes. When more than one planter box is utilized, the decorative elements and the supports for the planter boxes are alternatively slid into the slots as desired.

BRIEF DESCRIPTION OF THE DRAWINGS

The objects, features, and advantages of the present invention will appear from the following disclosure of an embodiment of the invention hereinafter described with reference to the drawings, in which:

FIG. 1 is a side elevational view of a portion of a building disclosing a window and one embodiment of the shutter of my invention on each side thereof;

FIG. 2 is a perspective, exploded view of several components of the shutter of this invention;

DESCRIPTION OF THE PREFERRED EMBODIMENTS

Figure 3:
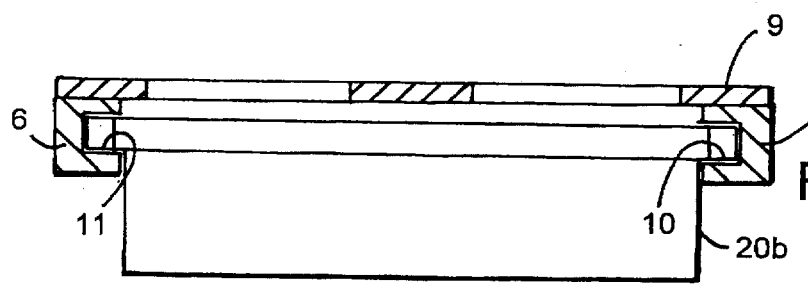
FIG. 3 is a cross-sectional view taken along the plane III—III of FIG. 2.

Referring to the drawings, particularly FIGS. 1, 2, and 3, reference numeral 1 designates a portion of a building in which is located the window 2 of any type. Located on each side of the window are shutters 3 which are identical and therefore only one will be described.

Shutters 3 each includes the shutter frame 4 constructed of vertical side frame members 5 and 6, the bottom frame member 7, and the top frame member 8. The side frame members 5 and 6, and the bottom frame member 7 are supported as disclosed in FIG. 2 by the support member 9. The upright sides or upright side member 5 and 6 each include a slot or groove 10 and 11, respectively. These slots 10 and 11 are exposed or open at the top of each of the side members 5 and 6 so as to receive the decorative elements 12 and the supports 23 for the planter boxes 20, 20a, and 20b which are identical and will now be described.

Planter boxes 20, 20a, and 20b can be of many different designs. As disclosed in FIG. 2 in relation to planter box 20 it includes two sides 21 and a configurated front side 22. Mounted at the rear is a support 23 extending outwardly of the sides 21 and configurated to be received within the slots 10 and 11. The width of planter boxes 20, 20a, and 20b, as disclosed in FIG. 3, are dimensioned to be received between the inner edges of the horizontal sides or side elements 5 and 6. Thus, the planter boxes fit between the vertical sides 5 and 6 as disclosed in FIGS. 1, 2, and 3.

In the modification of FIGS. 1, 2, and 3, a decor panel 15 is provided to give an added decorative effect to the shutter 3. As will be explained hereinafter this decor panel 15 is mounted by tabs 16 on support member 9 at the top of the upright members 5 and 6 after the decorative panels 12 and the planter boxes 20 are mounted in place between the two side elements 5 and 6.

The method of assembly of the various components of my shutter should be evident from FIG. 2. First, the two side members 5 and 6 and the bottom frame member 7 are rigidly secured to the support 9 by fasteners and/or glue. Then in the modification of FIGS. 1 and 2, the support members 23 of planter 20b are slid into the channels 10 and 11 down to the bottom frame member 7 so as to support and secure the lower most planter box 20b, at the very bottom of the shutter just above the lower or bottom frame member 7. Next, the decorative panels 12a are slid into the slots 10 and 11 above planter box 20b and then the second planter box 20a is installed by inserting its support members 23 into the slots 10 and 11 so as to support the second planter box 20a intermediate the top and bottom ends of the shutter 3. The next step is to insert additional decorative panels 12b above the second planter box 20a after which a third planter box 20 is located above the decorative panels 12b in the same manner as described above in relation to the first and second planter boxes 20a and 20b. Then in the modification of FIGS. 1 and 2, additional decorative panels 12c are slid into the slots 10 and 11 above the third planter box 20 after which the decor panel 15 is secured to the top rail 9a of the support 9. The top frame member 8 is then secured in place to fill the gap between decor panel 15 and the uppermost decorative panel 12. Having assembled the shutters 3 they are then mounted on building 1 on each side of the window 2 as disclosed in FIG. 1.

Figure 4:
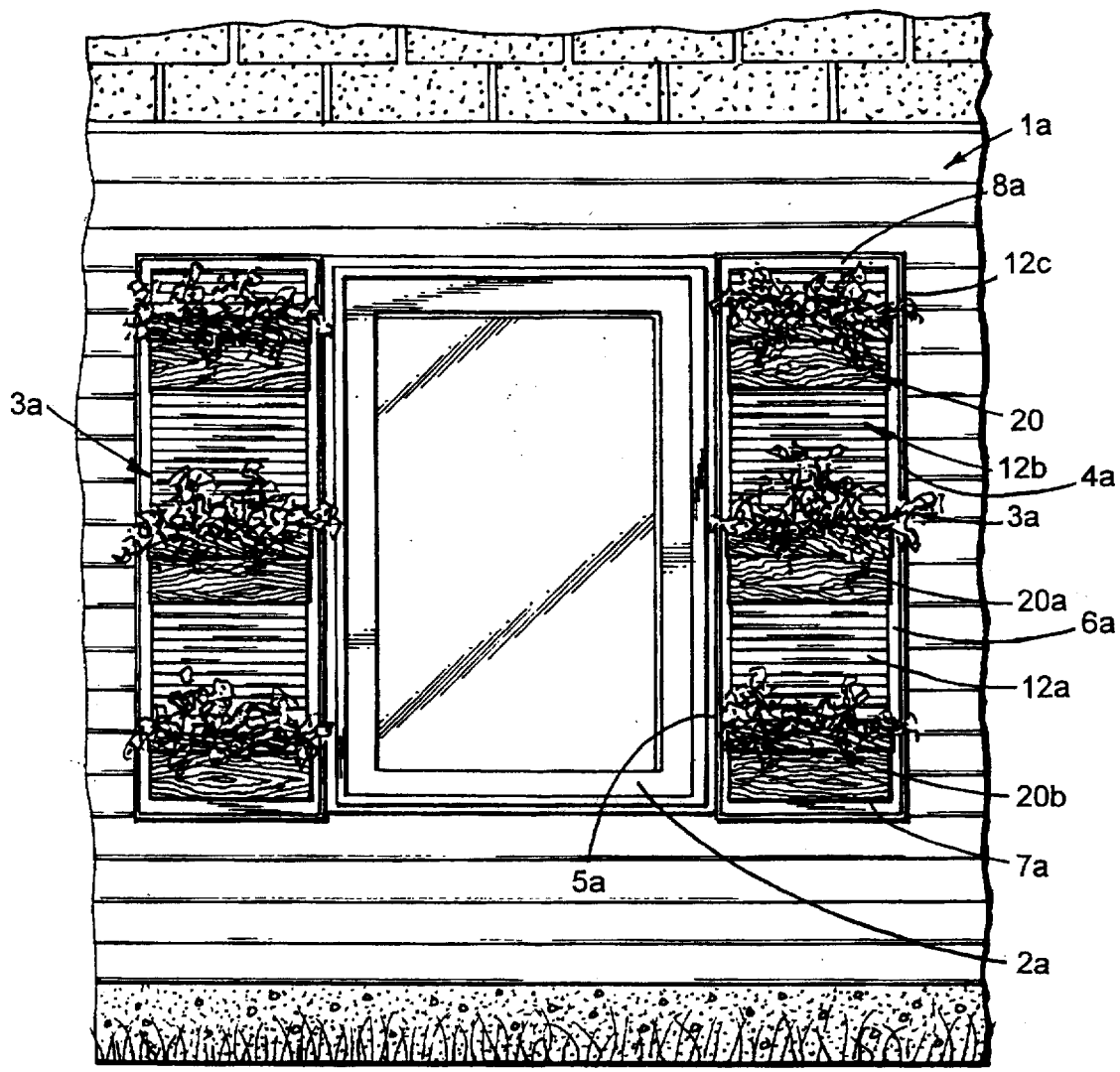
FIG. 4 is another embodiment of the shutter of this invention located on each side of a window similar to FIG. 1.

FIG. 4 is substantially the same as FIG. 1, the only difference is the lack of any decor panel 15. It thus includes the window 2a mounted in the building 1a. The shutter 3a includes the frame 4a having horizontal side elements 5a and 6a, the top frame member 8a and lower frame member 7a. The decorative panels 12a, 12b, and 12c along with planter boxes 20, 20a, and 20b are mounted in the frame 4a in the same way described above in relation to frame 4. It is understood that shutter 3a on the left side of the window 2a is identical to the shutter 3a on the right side. Further, the number of planter boxes and their relation to decorative panels can be varied as desired.

Having disclosed preferred embodiments of the present invention, it will be appreciated by those skilled in the art that variations may be made thereto without departing from the spirit of the invention or the scope of the appended claims.

The embodiments of the invention in which an exclusive property or privilege is claimed are defined as follows:

I claim:

1. In combination with a window of a building said window having vertical sides; a pair of vertically elongated shutters located on each vertical side of said window, the improvement comprising:

at least one planter box for each of said shutters, said planter boxes each extending laterally across its shutter and supported thereby;

said shutters each including a frame with spaced vertical sides having vertical slots therein; said vertical slots of said spaced vertical sides facing each other; and said planter boxes each including supports slidably extending into said vertical slots for supporting said boxes.

2. A shutter for providing a decorative effect on a vertical side of an opening to a building comprising:

said shutter having a frame including two vertical sides; decorative elements located between said vertical sides; and at least one planter box extending laterally across said shutter and supported by said shutter so as to be integral therewith;

said vertical sides having vertical slots therein; said vertical slots of said two vertical sides facing each other; and said planter box having supports slidably extending into said vertical slots for supporting said planter box.

3. The shutter of claim 2 in which said decorative elements also extend into said slots so as to be supported by said vertical sides.

4. A method of constructing the shutter of claim 2 in which said vertical sides are supported in spaced relationship with said slots facing each other and exposed at one end of said vertical sides; and sliding said decorative elements and said supports for said planter box into said slots at said exposed ends; and closing said exposed slots with an end frame member.

5. A shutter for providing a decorative effect on a vertical side of an opening to a building comprising:

said shutter having a frame including two vertical sides; decorative elements located between said vertical sides; and at least one planter box extending laterally across said shutter and supported by said shutter so as to be integral therewith;

said shutters having two or more of planter boxes extending laterally across said shutter with said decorative elements being located between at least two of said planter boxes;

said vertical sides have vertical slots therein; said vertical slots of said two vertical sides facing each other; and said planter boxes having supports slidably extending into said vertical slots for supporting said planter boxes.

6. A method of constructing the shutter of claim 5 in which said vertical sides are supported in spaced relationship with said slots facing each other and exposed at one end of said vertical sides; and alternately sliding said decorative elements and said planter boxes into said slots at said exposed ends depending upon the desired number and location of said planter boxes; and closing said exposed slots with an end frame member.

7. A shutter for providing a decorative effect on a vertical side of an opening to a building comprising:

said shutter having a frame including two vertical sides; decorative elements located between said vertical sides; and at least one planter box extending laterally across said shutter and supported by said shutter so as to be integral therewith;

said shutters having two or more of planter boxes extending laterally across said shutter with said decorative elements being located between at least two of said planter boxes;

said vertical sides have vertical slots and said vertical slots of said two vertical sides facing each other; and said planter boxes having supports slidably extending into said vertical slots for supporting said planter boxes; said decorative elements also extending into said vertical slots so as to be supported by said vertical sides.

* * * * *